United States Patent
Luo et al.

[11] Patent Number: 5,901,240
[45] Date of Patent: May 4, 1999

[54] METHOD FOR DETECTING THE COLLIMATION FIELD IN A DIGITAL RADIOGRAPHY

[75] Inventors: Jiebo Luo, Rochester; Robert A. Senn, Pittsford, both of N.Y.

[73] Assignee: Eastman Kodak Company, Rochester, N.Y.

[21] Appl. No.: 08/766,196

[22] Filed: Dec. 12, 1996

[51] Int. Cl.[6] .................................................. G06K 9/00
[52] U.S. Cl. ....................... 382/132; 382/281; 382/199; 382/173; 378/62; 378/37; 378/98.7; 250/584
[58] Field of Search ................................. 382/132, 173, 382/199, 128, 281; 378/62, 37, 98.7; 250/584

[56] References Cited

U.S. PATENT DOCUMENTS

| | | | |
|---|---|---|---|
| 4,804,842 | 2/1989 | Nakajima | 382/171 |
| 4,829,181 | 5/1989 | Shimura | 250/584 |
| 4,851,678 | 7/1989 | Adachi et al. | 250/587 |
| 4,914,295 | 4/1990 | Shimura et al. | 250/587 |
| 4,952,805 | 8/1990 | Tanaka | 250/586 |
| 4,952,807 | 8/1990 | Adachi | 250/587 |
| 4,962,539 | 10/1990 | Takeo et al. | 382/180 |
| 4,970,393 | 11/1990 | Funahashi | 250/587 |
| 4,977,504 | 12/1990 | Funahashi | 382/132 |
| 4,995,093 | 2/1991 | Funahashi et al. | 382/132 |
| 5,032,733 | 7/1991 | Takeo et al. | 250/559.06 |
| 5,081,580 | 1/1992 | Takeo | 250/582 |
| 5,164,993 | 11/1992 | Cappozi et al. | 382/132 |
| 5,268,967 | 12/1993 | Jang et al. | 382/132 |
| 5,506,913 | 4/1996 | Ibison et al. | 382/132 |
| 5,606,587 | 2/1997 | Barski et al. | 378/62 |
| 5,663,511 | 9/1997 | Lee et al. | 250/587 |
| 5,668,888 | 9/1997 | Doi et al. | 382/132 |

FOREIGN PATENT DOCUMENTS

| | | | |
|---|---|---|---|
| 2071247 | 3/1990 | Japan | A61B 6/06 |
| 7181609 | 7/1995 | Japan | G03B 42/02 |

*Primary Examiner*—Leo H. Boudreau
*Assistant Examiner*—Ishrat I. Sherali
*Attorney, Agent, or Firm*—William F. Noval

[57] ABSTRACT

A method of processing a digital radiographic image includes the following the steps. (1) A digital radiographic image having a radiation region and a collimation region defined by collimation blades at least partially bounding the radiation region is provided. (2) Pixels of the digital radiographic image are detected and classified as collimation boundary transition pixels. (3) Candidate collimation blades are detected and classified from the collimation boundary transition pixels. (4) At a regional level, the collimation region are determined from the results of the line-level delineating step.

9 Claims, 6 Drawing Sheets

METHOD FOR DETECTING THE COLLIMATION FIELD IN A DIGITAL RADIOGRAPHY

FIELD OF INVENTION

This invention relates in general to a method for the detection of collimation or, equivalently, the radiation field in digital radiography and more particularly to such a method to facilitate optimal tone scale enhancement, to minimize the viewing flare caused by the unexposed area, and to benefit image segmentation and body part identification.

BACKGROUND OF THE INVENTION

In digital radiography, computed radiography (CR) is a medical imaging technique that captures the information using storage phosphor screens. The information is stored as a latent image for later read-out by a laser scanning system. The latent image signal remains stable for a certain period of time ranging from minutes to days. Using a red or near-infrared light to stimulate the phosphor screen which will then release its stored energy in the form of visible light, one can observe the phenomenon known as photostimulable luminescence. The intensity of the stimulated luminescence is proportional to the number of x-ray photons absorbed by the storage phosphor. In practice, the read-out process is accomplished using a laser scanner in order to provide high resolution data and also not to flood the screen with stimulating light. The stimulated light emitted from each point on the screen is collected and converted into a digital signal. The screen is erased by flooding the entire screen with high illuminance light. This allows the screen to be reused. Such a CR imaging system is illustrated in FIG. 1. As shown, an x-ray source 10 projects an x-ray beam 12 through a body part 14 of person 16 to produce a latent x-ray image stored in storage phosphor 18. Collimation blades 20 limit the size of the x-ray beam. The storage phosphor 18 is scanned by a laser beam 22 from laser 24 deflected by deflector 26 driven by rotor 28 as storage phosphor 18 is moved in direction 30. Light emitted by storage phosphor 18 is filtered by filter 32 and detected by photodetector 34. The signal produced by photo detector 34 is amplified by amplifier 36, digitized by analog to digital converter (A/D) 38 and stored in memory 40.

In their practice, radiologists may use x-ray opaque materials to limit the radiation scattering, and shield the subjects from unnecessary exposure to x-rays. Such x-ray opaque materials constitute the "collimation". As illustrated in FIG. 1, the collimation blades 20 are placed in between the x-ray source 10 and the subject 16, and are typically closer to the source 10. As a result, those body parts of the patient 16 which are not important to diagnosis, but which may be vulnerable, are protected. Furthermore, the use of collimation can also limit the radiation scattering from unintended regions from fogging the screen.

In general, the resulting digital images need to be enhanced through code-value remapping in order to provide maximum visual contrast in the region of interest prior to display or printing. Such a process is referred to as tone scaling. The dynamic range of the CR systems (over 10,000:1) provides significant advantage over conventional film in terms of exposure latitude so that CR imaging is very tolerable to improper selection of exposure conditions. However, to optimally render such data on desired printing or display devices, it is necessary to develop a tone scale remapping function. To this end, it is desirable to exclude the shadow regions cast by the collimation from the calculation of the histogram statistics because these regions provide no useful information but distort the intensity histogram. Moreover, since the shadow regions are usually with the highest brightness levels (corresponding to minimum density), the flare can be reduced by setting the shadow regions to a comfortable brightness level or reducing their average brightness level. Such a process is referred to as masking.

Radiation field recognition, preferably done automatically, is the key to masking and is also important to tone scaling. However, it is a very challenging task. In CR, we have significant difficulties to overcome: (1) the boundaries between the region of interest and the shadow regions are usually fuzzy due to the radiation scattering, (2) the region of interest often has significant modulation including prominent edges, (3) the shadow regions may have some comparable modulation and therefore are not uniform due to the radiation scattering from the region of interest, (4) boundaries may be invisible near very dense body parts due to the lack of x-ray penetration, or the frequent underexposure in order to minimize the x-ray dosage.

Due to the practical use and the technical difficulties in collimation recognition, there have been considerable efforts on this subject in the past. Thus, U.S. Pat. No. 4,952,807, inventor Adachi, issued August 1990, assumes that the collimation does not touch the object of the image and the search of collimation boundary is by scanning inwards from image borders to detect the object portion surrounded by the background region. The assumption is not always valid, in particular in shoulder or skull examinations. U.S. Pat. No. 4,804,842, inventor Nakajima, issued February 1990, excludes the shadow region by finding the first valley and thus removing the lower part of the histogram. The basic assumption of this patent technique is that the code values of the those pixels inside the radiation field should be higher than those of the pixels in the collimation shadow regions, which is not always valid. These two patents only address the tone scale problem which does not demand an explicit detection of the collimation boundaries. U.S. Pat. No. 4,970,393, inventor Funahashi, issued November 1990, thresholds 1st derivatives along predetermined scan lines. Japan Patent 2,071,247, inventor Takeo, issued March 1990, and U.S. Pat. No. 5,081,580, inventor Takeo, issued January 1992, assumes strong signal-to-shadow boundaries in terms of the amplitude of the 1D differentiation along the radial lines from the center of the image. U.S. Pat. No. 4,995,093, inventors Funahashi et al., issued February 1991, applies Hough Transform to edge pixels with significant gradient magnitude. U.S. Pat. No. 4,977,504, inventor Funashi, issued December 1990, and the U.S. Pat. 5,268,967, inventors Jang et al., issued December 1993, describe a distinctive approach which classifies non-overlapping small tiles. U.S. Pat. No. 4,952,805, inventor Tanaka, issued August 1990, tests a series of possible hypotheses with respect to the characteristics of the inside and the outside histograms to determine the presence or absence of a radiation field. Japan Patent 7,181,609, inventor Takeo et al. issued July 1995, is unique in that it constructs a decision network consisting several parallel recognition processes, including a first means for detecting rectangular boundaries using boundary contrast, a second means for close-contour tracing to explicitly deal with arbitrarily curved shape irradiation field, a third means for irradiation field determination using imaging information (collimation shape and position, exposure, etc.) and exam type information, and a fourth means using the projections. The final radiation is determined through a coordinating procedure.

Other related patents include U.S. Pat. No. 4,829,181, inventor Shimura, issued May 1989 (using 1D linear edge detection and Hough transform), U.S. Pat. No. 4,851,678, inventors Adachi et al., issued July 1989, (using differentiation processing and also assuming higher code values in the radiation field), U.S. Pat. No. 4,914,295, inventors Ishida et al., issued April 1990, (background detection), U.S. Pat. No. 4,962,539, inventors Shimura et al., issued July 1991 (recognizing the layout pattern in the radiation images by binary pattern matching), U.S. Pat. No. 5,032,733, inventors Funahashi et al., issued July 1991 (detecting unexposed regions in multiple exposed images by locating low variation and low signal level regions).

SUMMARY OF THE INVENTION

According to the present invention, there is provided a solution to the problems of the prior art.

According to a feature of the present invention, there is provided a method of processing a digital radiographic image comprising the steps of:

providing a digital radiographic image having a radiation region and a collimation region defined by collimation blades at least partially bounding the radiation region;

detecting and classifying pixels of the digital radiographic image as collimation boundary transition pixels;

line-level delineating of candidate collimation blades from the collimation boundary transition pixels; and determining at a regional level the collimation region or, equivalently, the radiation region, from the results of the line-level delineating step.

ADVANTAGEOUS EFFECT OF THE INVENTION

The use of explicit collimation boundary detection rather than a more general edge detection (e.g., Sobel or Canny edge detectors) greatly reduces the number of pixels that have to be dealt with at later stages. The Hough transform provides a global accumulation of evidence which can be more robust with respect to limitations of edge linking (e.g., dealing with discontinuous edge segments). The accumulation-of-evidence nature of the final stage lends itself well to the computation of a continuously valued figure-of-merit associated with a particular combination of blades, minimizing the number of binary thresholds and heuristics that must be determined during tuning and updating of the system. Due to the novel design of the method, its computational efficiency lends itself to both on-line and off-line operations. The current method also offers advantages in flexibility, extendibility and potential performance.

BRIEF DESCRIPTION OF THE DRAWINGS

FIG. 2b is a graphical view of a line profile through the collimation boundary of the radiograph of FIG. 2a.

DETAILED DESCRIPTION OF THE INVENTION

Figure 7:
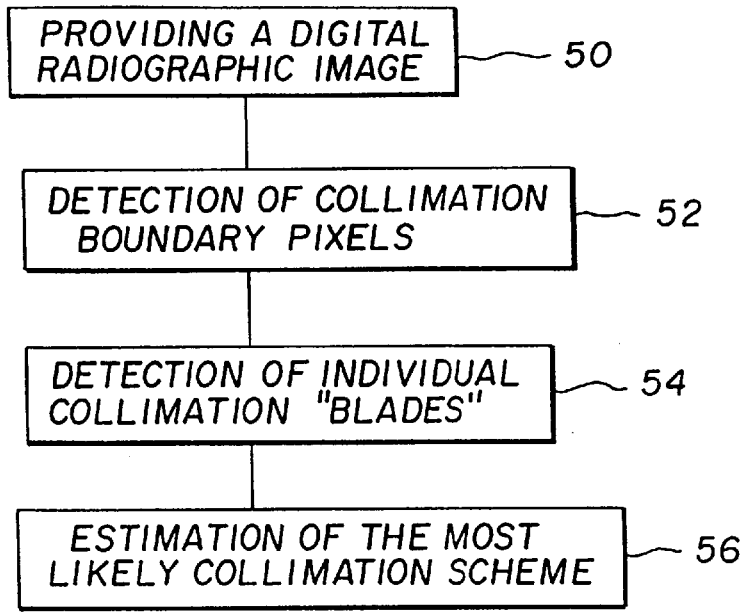
FIG. 7 is a block diagram illustrating the method of the present invention.

In general, the present invention, is a new method for the recognition of the collimation, or equivalently, detection of the radiation field in a digital radiographic image. Based on a priori knowledge of the collimation process, the current method consists of three stages of operations (method steps) after a digital radiographic image is provided (FIG. 7, box 50): (1) pixel-level detection and classification of collimation boundary transition pixels (box 52); (2) line-level delineation of candidate collimation blades (box 54); and (3) region-level determination of the collimation configuration (box 56). The main motivation for such a three-stage scheme is the past experiences in related work. It has been found that the edge profile of the collimation boundary and the skin line show quite distinctive characteristics. Edge profile analysis can reliably identify whether an edge pixel sits on the transition from the shadow region to the irradiation field, or on the skin-line (i.e., the transition from directly exposed region to tissue). Therefore, as the starting point, edge pixel detection and classification is performed in stage 1. Then, the edge pixels need to be bound together and then edge segments need to be grouped together to form potential collimation blades. This is accomplished using the Hough Transform (HT) and robust peak detection in the HT domain. In order to reduce the number of "false alarm" line structures and hence the number of possible combinations of the collimation blades, the detected line structures are pre-screened with respect to a series of figure-of-merit (FOM) measures. Stage 2 results in limited number of candidate blades which are then passed to stage 3. In the final stage, the candidate blades are assembled into collimation configurations, or regions. To improve the computational efficiency, each possible configuration is represented by a node in a decision tree which is then traversed with depth-first strategy. For each node, two types of figure-of-merit are computed in terms of about a dozen geometry FOMs and region FOMs. The overall FOM is the summation of all the applicable FOMs, which are essentially "fuzzy scores". Therefore, the top-down traversing of the tree is equivalent to an evidence accumulation process. The FOM can be inherited from parent nodes to children nodes. A branch may be trimmed at the point where the FOM is already below certain threshold, as will be addressed later.

In summary, the overall scheme is built upon edges yet it utilizes edge as well as region based information. A histogram-based region segmentation scheme is unlikely to perform well because the intensity distribution inside the irradiation field and inside the collimation region can significantly overlap with each other. Furthermore, the contrast in the image is generally poor and the shadow regions are usually not uniform. Although stage 1 is edge-oriented, the detection and classification of the edge pixels are conducted within the context of the neighborhood. In stage 2, region-based properties are measures on both sides of a candidate blade. Finally, stage 3 evaluates each legitimate configuration using both edge-based and region-based FOMs. By combining both edge and region based information, we are able to achieve a very high performance with very high efficiency.

Figure 1:
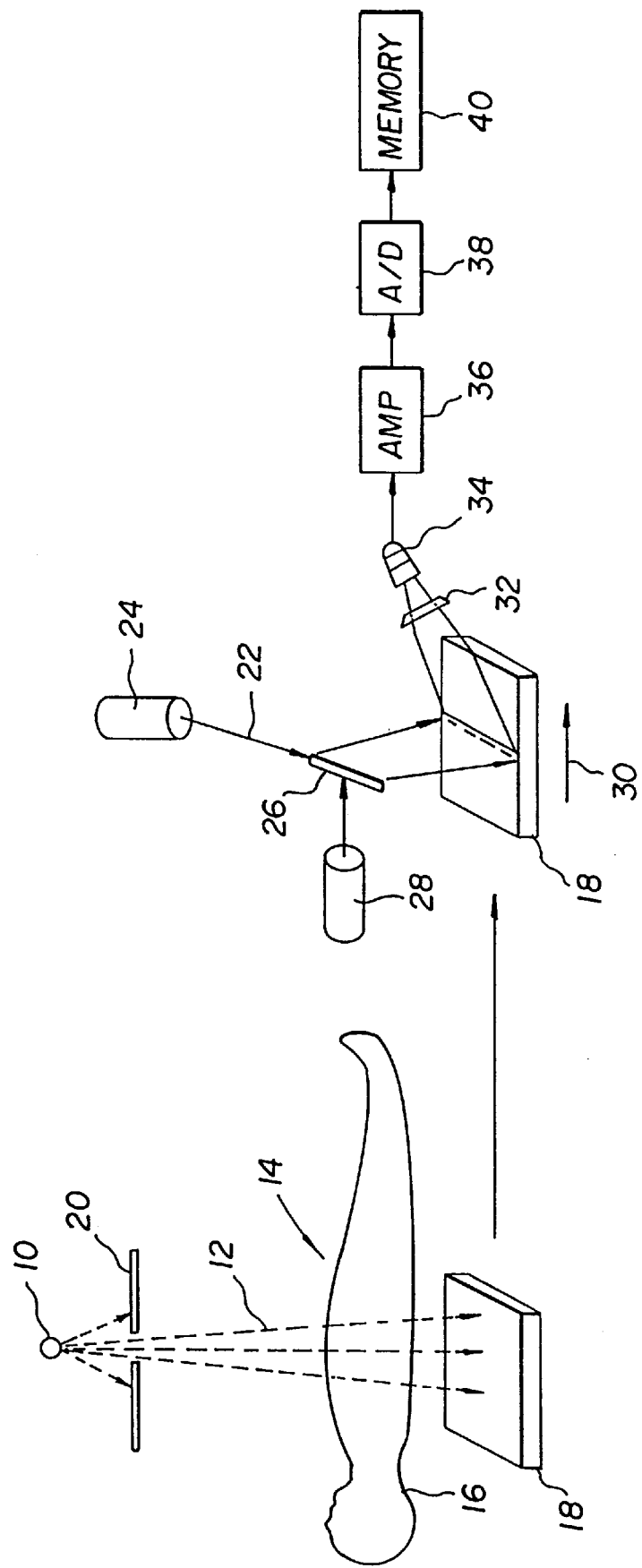
FIG. 1 is an diagrammatic view illustrating a computed radiography digital imaging system.

The method of the present invention operates as a series of operations performed on a digital radiographic image having a radiation region and a collimation region defined by collimation blades at least partially bounding the radiation region. The digital image can be formed by a digital image acquisition system which can be, for example, (1) standard x-ray screen/film combination which produces an x-ray film image which is processed chemically or thermally and the processed film digitized by a scanner/digitizer 130; (2) a computed radiography system where a latent x-ray image is formed in a storage phosphor and a corresponding digital image is produced by reading out the storage phosphor by a reader (FIG. 1); (3) a diagnostic scanner (such as MRI, CT, US, PET, Ultrasound) produces an electronic x-ray image which is digitized; or (4) a direct digital acquisition system, such as a CCD array.

Figure 8:
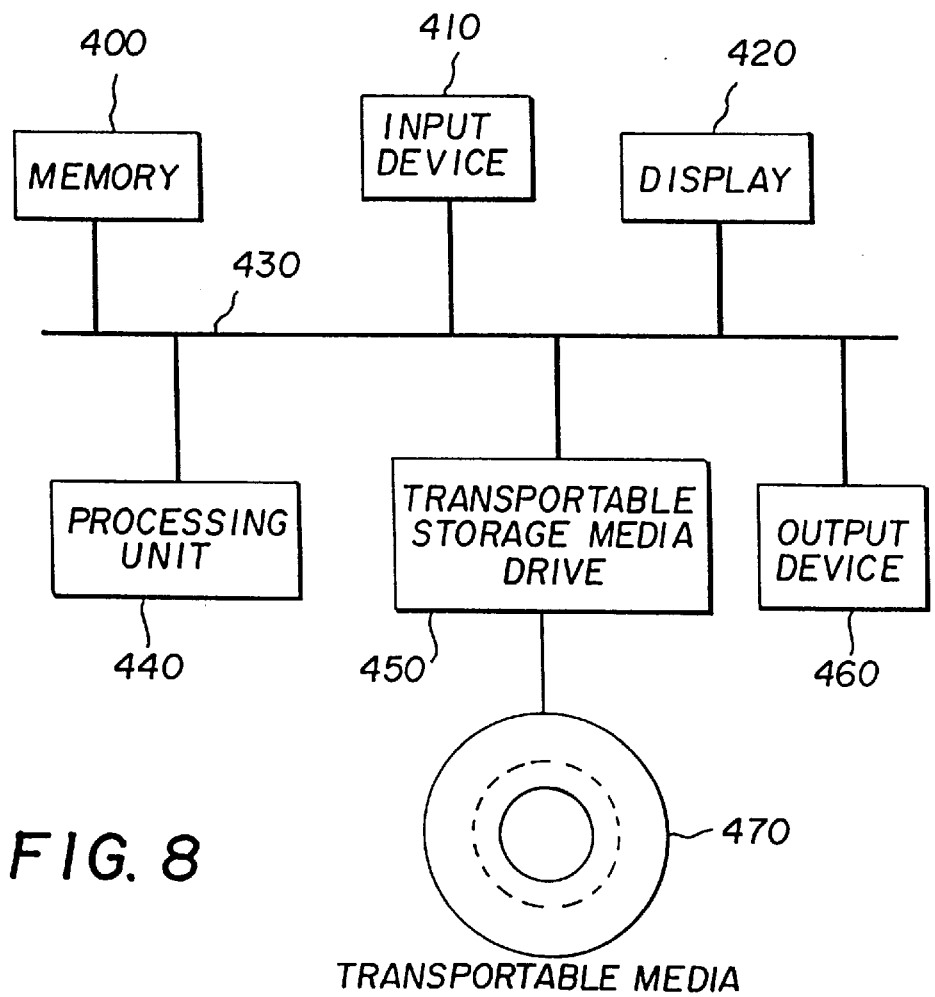
FIG. 8 is a block diagram of an image processor for carrying out the method of the present invention.

The digital radiographic image is processed in an image processor, according to the method of the present invention. The image processor can take the form of a digital computer, such as illustrated in FIG. 8. In such a case, one or more of the steps of said method can be carried out using software routines. The image processor can also include hardware or firmware for carrying out one or more of said method steps. Thus, the step of the method of the invention can be carried out using software, firmware, hardware, either alone or in any preferable combination.

As shown in FIG. 8, a digital computer includes a memory 400 for storing digital images, application programs, operating systems, etc. Memory 400 can include mass memory (such as hard magnetic disc or CD ROM), and fast memory, (such as RAM). A computer also includes input devices 410 (such as a keyboard, mouse, touch screen), display 420 (CRT monitor, LCD), central processing unit 440 (microprocessor), output device 460 (thermal printer, dot matrix printer, laser printer, ink jet printer, diagnostic transparency printer). A computer can include a transportable storage medium drive 450 for reading from and/or writing to transportable storage media 470, such as a floppy magnetic disk or writeable optical compact disk (CD). Components 400, 410, 420, 440, 450, and 460 are connected together by a control/data bus 430.

As used in this application, computer readable storage medium can include, specifically, memory 400 and transportable storage media 470. More generally, computer storage media may comprise, for example, magnetic storage media, such as magnetic disk (hard drive, floppy disk) or magnetic tape; optical storage media, such as optical disk, optical tape, or machine readable bar code; solid state electronic storage devices, such as random access memory (RAM), read only memory (ROM); or any other physical device or medium which can be employed to store a computer program.

Detection and Classification of the Collimation Boundary Transition Pixels

The purpose of stage 1 is to identify the collimation boundary pixels for use in stage 2. The process used is essentially that of smart edge detection based on a classifier and a priori knowledge of the collimation process. This smart edge detection approach can have significant advantages over the use of a blind gradient based edge detection when applied to preprocessing for the HT in stage 2 in terms of minimizing the likelihood of detecting unwanted edges associated with the skin-line, hardware, and other clutters. Also, minimizing the number of pixels that need to be considered in the Hough transform can provide an advantage in terms of computational efficiency.

The method performs the search for collimation boundary pixels first using a line-by-line search of each horizontal line of the image. This is followed by applying the identical process to each vertical column of the image. As the process used is independent of the orientation applied, the following will use the term line to mean either a horizontal row of pixels or a vertical column. First, after smoothing the line to minimize the impact of noise, the significant transitions (monotonically increasing or decreasing segments of pixels) are identified. The smoothing is performed with the application of a 3×1 Gaussian convolution kernel.

Figure 2A:
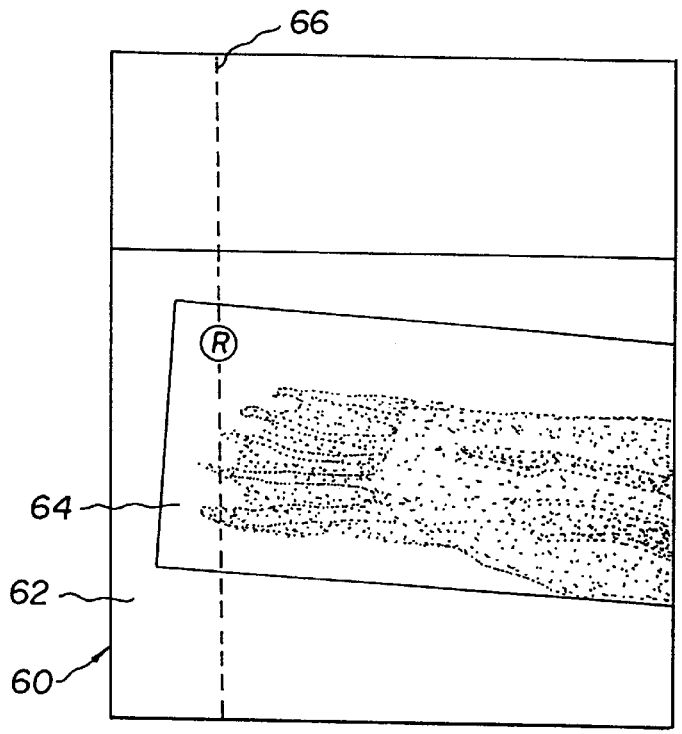
FIG. 2a is a diagrammatic view of a radiograph showing a radiation region and a collimation region.
Figure 2B:
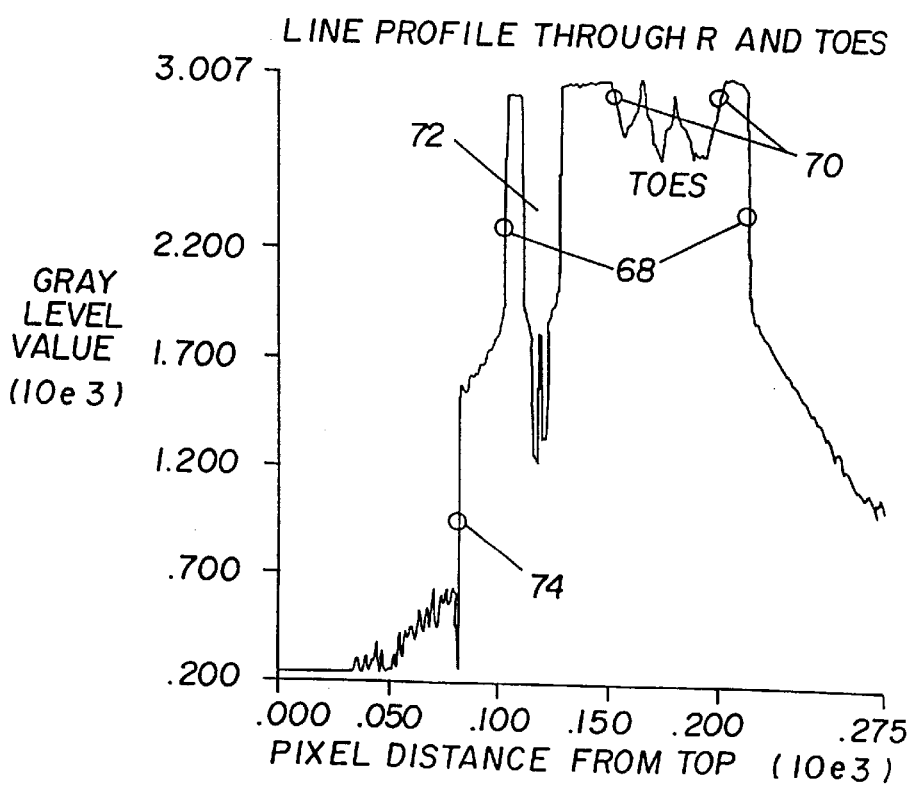
Figure 3A:
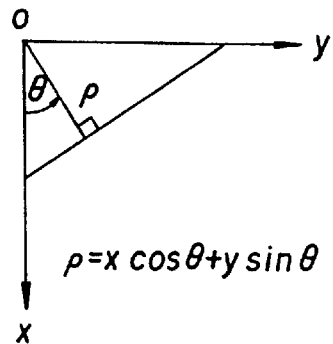
FIGS. 3a and 3b are graphical illustrations respectively of the Hough Transform (HT) and the quantization of the HT plane.
Figure 3B:
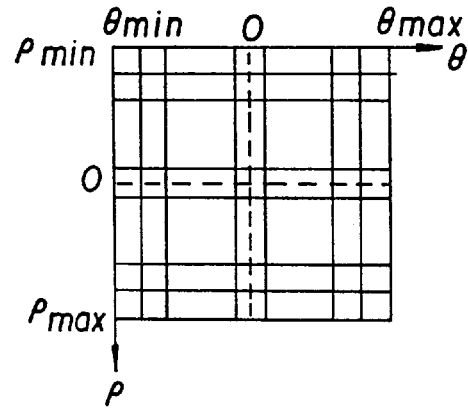

FIG. 2a shows a radiograph 60 having a collimation region 62, a radiation region 64, and a vertical scan line 66 through the radiograph 60. FIG. 2b shows an example line profile of the scan line and the significant transitions associated with the collimation boundaries 68, skin-line 70, clutter 72 (the letter "R"), and a secondary collimation boundary 74. To minimize the computational burden as well as the number of false-positives, the method of the invention does not attempt to classify every transition of a given line. Rather, the search for the left and right (or top and bottom) collimation boundary transition progresses from the image border inward, terminating where an acceptable transition is found. Note that this choice may limit our ability to identify multiple exposure cases which will be discussed in more detail later. It has been observed that the likelihood of correct classification depends on a number of factors that will be described below. To allow stage 2 to take advantage of this knowledge, rather than output simply a binary decision regarding the likelihood of a transition being a collimation boundary, the likelihood will be quantized to one of four values. The gray level values that will be used in the map passed to stage 2 will be 0, 64, 128, and 255. However, the actual values are not significant and they can be thought of as "not likely", "low likelihood", "moderate likelihood", and "high likelihood", respectively. Note that stage 1 associates this likelihood value to a transition rather than a single pixel. The spatial location of the "boundary pixel" is taken to be the pixel of the transition whose gradient across its nearest neighbors is the largest for that transition.

The process used to classify each transition depends on the availability of a direct-exposure estimate. If direct-exposure is detected a two pass approach is used. In the first pass the method uses the classifier of the skin-line detection process to identify direct exposure-collimation boundary transitions. This classification process involves the computation of the set of features shown in Table 1. A least mean square (LMS) error fit of a general quadratic model, as given in Equation (1), to the transition in question is performed. Computation of the features is followed by application of a Gaussian maximum likelihood classifier. Since the boundary transitions found in this first pass are the most reliable, the pixels associated with the maximum gradient of these transitions are labeled with a count of 255 ("high likelihood"), which corresponds to a collimation-direct exposure, or foreground-background (later referred to as F/B), transition. The results of this first pass (in both orientations) are also used to establish an estimate of the maximum gray level of the collimation using the histogram of the beginning points of the direct exposure-collimation boundary transitions. To minimize sensitivity to classifier errors, rather than the absolute maximum gray level, the gray level of the first histogram bin from the right whose population exceeds some threshold number of pixels is used as the estimate of the maxima. This estimate will be used by the second pass to help identify tissue-collimation boundary transitions.

$$A x x^2 + B x x y + C x y^2 + D x x + E x y + 1 = 0 \qquad (1)$$

TABLE 1

Features computed for each transition.

| Feature | Description |
| --- | --- |
| 0 | transition length |
| 1 | transition range |
| 2 | transition background deviation |
| 3 | transition maximum slope |
| 4 | coeff. of $x^2$ of Eq. (1), i.e. A |
| 5 | coeff. of $x * y$ of Eq. (1), i.e. B |
| 6 | coeff. of $y^2$ of Eq. (1), i.e. C |
| 7 | coeff. of x of Eq. (1), i.e. D |
| 8 | coeff. of y of Eq. (1), i.e. E |
| 9 | sum of squared errors of the model fit |

If sufficient collimation/direct-exposure pixels are identified to get a robust estimate of the collimation gray level maxima, then a second pass through the image is used to attempt to identify collimation-tissue boundaries given the collimation gray level maxima. For many exam types the collimation-tissue boundary transition will span the collimation maxima established as described above. However, for some more dense body parts (e.g., pelvis, shoulder, etc.) the gray level of the tissue region near the boundary may be below that of the collimation gray level maxima, that is, the gray level of the tissue region may fall below some of the "unexposed" area of the collimation. One contributing factor to this is the close proximity of the body to the film/storage phosphor screen which minimizes the scatter reaching the screen behind the tissue. Recall that the collimation blades near the source are farther from the screen, allowing more opportunity for radiation scattering to fog the screen in the collimation region. Therefore, we require that the beginning of the transition (in the potential collimation region) be less than the collimation gray level maxima. However, the ending point of the transition (the potential tissue region) only has to exceed some predefined ratio (SPAN_RATIO≦1) of the collimation gray level maxima. In addition to this "spanning" test a transition is only labeled as a collimation boundary transition if the range of the transition (span of the gray level from beginning to end) exceeds some threshold MIN_RANGE and the maximum gradient along the transition exceeds some threshold MIN_GRADIENT. Upon passing these tree tests ("spanning", range, and gradient), the transition is labeled as a "moderate likelihood" (code 128) collimation boundary, which corresponds to a collimation-tissue, or foreground-tissue (later referred to as F/T), transition.

If no direct-exposure area is found or an insufficient number of collimation-direct-exposure pixels are found to establish an estimate of the collimation gray level maxima, only the range and gradient tests described above are performed. Note that this collimation boundary classifier has degraded to a threshold on the gradient after removing those candidates that didn't pass the range test. This approach is not as reliable as the cases when estimates are available for the direct-exposure and collimation gray levels. Therefore, these transitions are labeled only as "low likelihood" (code 64) boundary transitions, which correspond to other significant (later referred to as O/T) transitions. Any transitions not passing the tests described above are labeled as "not likely" (code 0) to be a collimation boundary transition. Note that this worst scenario (no direct-exposure and hence no collimation gray level knowledge) is still marginally better than the traditional approach of using a gradient operator followed by thresholding as the preprocessing to the Hough transform in that some transitions associated with clutters in the collimation region as well as those associated with internal body structures (e.g., bones) can be eliminated due to their limited range.

The result of stage 1 is an edge label image including edge pixels corresponding to potential collimation blades.

Delineation of the Candidate Collimation Blades

After the edge pixels corresponding to potential collimation blades are detected and classified with respect to the confidence of these pixels in stage 1, the task of stage 2 is to form candidate line structures which will constitute the collimation configuration. If we consider stage 1 to be working at the pixel level, stage 2 is to provide intermediate line level information, i.e., candidate collimation blades and the associated properties (e.g., polarity) and goodness of these lines, to stage 3, where the blades are assembled to generate the final collimation mask3 Only a limited number of candidate blades will be passed from stage 2 to stage 3 so that not only is the computation burden of stage 3, i.e., the total number of possible collimation configurations significantly reduced, but the performance of the overall radiation field recognition can also be significantly improved. In general, our goal is to pass a maximum of 16 candidate blades per image to stage 3. In summary, the objectives of stage 2 are (1) to extract straight line-structures, (2) to eliminate poorly defined lines, (3) to eliminate illegal lines, (4) to associate each candidate blade with properties and goodness, in order to improve the efficiency and performance of stage 3.

The delineation of the candidate collimation blade is accomplished as the following. Firstly, the Hough transform (HT) is performed on the edge label image. In the edge label image, a nonzero pixel will make contributions to the accumulation array in the HT domain. The major advantage of the HT is that, instead of conventional edge walking approach, the evidences supporting the hypotheses of lines are accumulated only at locations where nonzero pixels are present This significantly reduces the amount of search required. Typically due to the edge analysis and classification, there are only around 1% nonzero pixels, regardless of the transition type, in the edge label image. Furthermore, collinear line segments are naturally grouped together without going through some sophisticated tests. Secondly, local peaks with significant bin-occupancy, corresponding to significant line structures, need to be detected. Finally, the eligibility of each detected line needs to be examined in order to identify those which will make legitimate collimation blades.

Here we briefly summarize the Hough transform. Hough transform is an attractive alternative to edge linking based on local analysis. Rather, it is based on global relationship between pixels constituting a certain shape, in this case, a straight line. A straight line that goes through a point (xy) in xy plane can be given by Equation (2). The, range of angle θ is ±90°, measured with respect to the x axis. For example, a horizontal line has θ=0° and a vertical line has θ=90°. The range of offset p is $\pm \rho_{max}$ with $\rho_{max}=\sqrt{(nrows)^2+(ncols)^2}$. Consequently, M collinear points lying on a line $\rho_i=x \cos\theta_i+y \sin\theta_i$ will generate M sinusoidal curves that intercept at $(\rho_i,\theta_i)$ in the ρθ plane. The accuracy of the line detection is determined by the quantization of the ρθ plane.

$$\rho = x\cos\theta + y\sin\theta \qquad (2)$$

Upon the completion of the Hough transform, a robust peak detection is necessary to reliably identify all the "true positives," i.e., peaks corresponding to actual line structures, while excluding as many as possible of the "false positives," e.g., secondary peaks due to the quantization of both image space and transform space. Even in the ideal case, line structures can have mutual "cross-talk", and a dashed-line can create a "spider-net" like pattern in the Hough transform plane. Moreover, the limited spatial resolution of the image plane can result in jaggedness of the line and consequently the splitting of the ideal unique peak into a small ambiguous "plateau" with several secondary peaks, while the quantization of the transform domain can introduce "split" or "merge" effect. In practice, often there are "noises", such as isolated pixels, regular or irregular curves, in the image. Such "noise" pixels can cause significant "cross-talk" or interference with the line structures. Therefore, a robust peak detection is nontrivial.

The peak detection consists of the following procedures:

Twisted extension of the Hough plane

Figure 4:
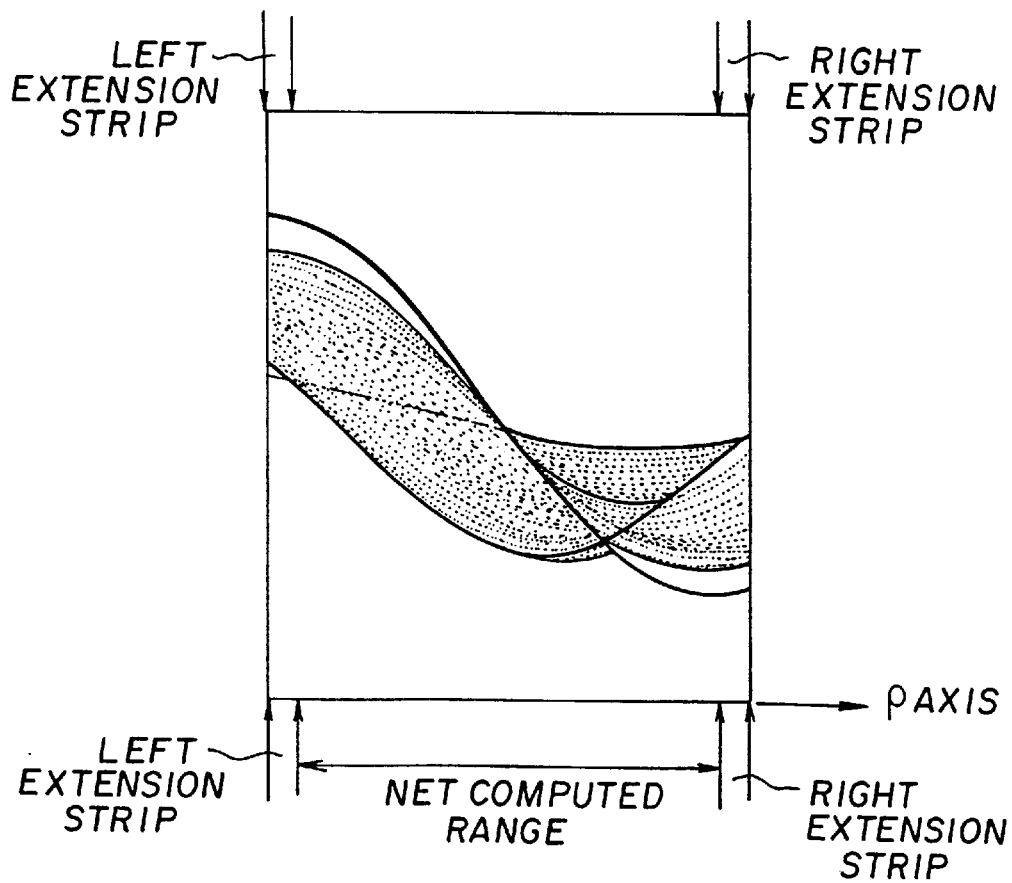
FIG. 4 is a diagrammatic view illustrating the twisted extension of the HT plane.
Figure 5:
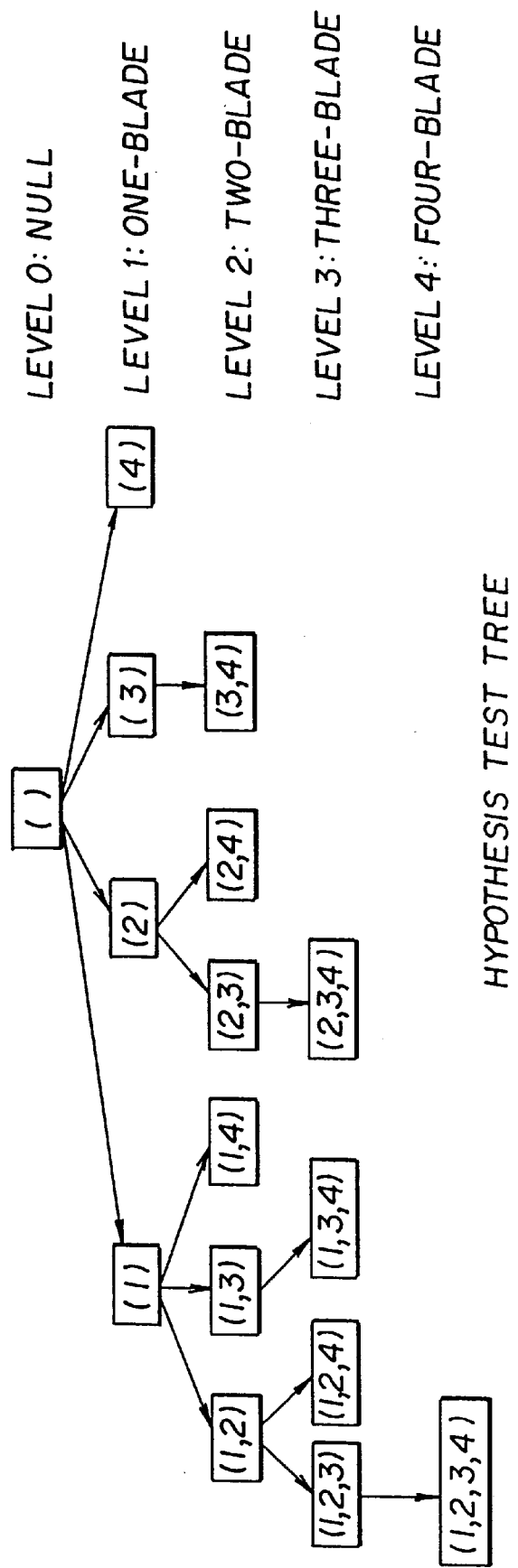
FIG. 5 is a diagrammatic view illustrating the depth-first tree-structured hypothesis testing.

In order to detect peaks near the boundaries of the resulting Hough plane, an extension of the plane is necessary. The Hough transform space we choose is of minimum redundancy in the sense we only compute an angular range from −90° to 90° to reduce unnecessary computation. Note that the entire Hough plane is cyclic with respect to the angle. More careful observation shows that a symmetry with respect to the origin of Hough plane exists. A twisted extension, in which a rectangular stripe of the left side is cut out and rotated 180° and then appended to the right side, and vice versa, correctly serves the purpose of boundary extension. An example is shown in FIG. 4.

De-noising by the "butterfly" filter

It is found that the true peaks corresponding to straight lines have a unique spatial structure in their neighborhood. A true peak is the intersection points of a family of sinusoidal curves. In general, it appears as a "butterfly" in the HT plane. To suppress secondary peaks due to the limited spatial resolution, and other false peaks due to cross-talk, the following de-noising kernel of a "butterfly" shape is designed and applied to the HT plane. A true peak with a "butterfly" shape will not be affected by the filtering. On the other hand, a false peak, e.g., a secondary peak will be suppressed by the "negative" weights of the kernel.

$$\begin{bmatrix} 0 & -2 & 0 \\ 1 & 3 & 1 \\ 0 & -2 & 0 \end{bmatrix}$$

Peak detection within a local window

To further minimize false peaks, a local window of size wsize is used. A peak is detected if a bin in the HT plane is the local maximum within the sliding window centered around the current bin. The size of the window determines the width of the rectangular stripe being cut and pasted in the twisted boundary extension. The minimum width of the stripe is equal the half span of the window. A peak also has to meet the minimum peak_bin_occupancy requirement MIN_BIN_OCCUPANCY to quality.

In order to eliminate poorly defined lines and reduce the ineligible lines (even if perfectly straight and strong), we develop a δ-band based inspection method to select only the lines that will make possible candidates for collimation blades. A narrow band, referred to as δ-band, is created for the line associated with each previously detected peak. Such a δ-band is super-imposed on the image containing the classified transition pixels. The advantage of using the δ-band is to avoid an explicit edge-walking process which usually involves lengthy searching. Moreover, within each δ-band, a series of characteristic and goodness measures can be readily computed, including beginning_point: coordinates of the first point found within the δ-band along its orientation ending_point: coordinates of the last point found within the δ-band and along its orientation FBnum_in_band: total number of F/B transition pixels found within the band FTnum_in_band: total number of F/F transition pixels found within the band OTnum_in_band: total number of O/T transition pixels found within the band goodblade: the composition of the blade as given by $$goodblade = \frac{FBnum\_in\_band \times 1.0 + FTnum\_in\_band \times 0.5 + OTnum\_in\_band \times 0.25}{Plen} \quad (3)$$

FBnum_behind: total number of F/B transition pixels found behind the band (blade)

FTnum_behind: total number of F/T transition pixels found behind the band (blade)

OTnum_behind: total number of O/T transition pixels found behind the band (blade)

hits_in_band: total number of edge pixels found within the δ-band, i.e., the summation of FBnum_in_band, FTnum_in_band and OTnum_in_band gaps_in_band: total number of continuous gaps within the band Plen: projected length of the blade between two ending points, i.e., the distance between the starting point and ending point misses_in_band: total number of misses (as projected along the orientation of the δ-band) between two ends within the δ-band, note that $$misses\_in\_band \neq Plen - hits\_in\_band \quad (4)$$

straightness1: straightness measure defined as $$staightness1 = \frac{hits\_in\_band}{peak\_bin\_occupancy} \quad (5)$$

straightness2: straightness measure defined as the variance of the normal at each transition pixel within the δ-band.

connectiveness1: connectiveness measure as given by $$connectiveness1 = 1 - \frac{misses\_in\_band}{\max(Plen, hits\_in\_band)} \quad (6)$$

connectiveness2: connectiveness measure as given by $$connectiveness2 = \frac{gaps\_in\_band}{misses\_in\_band} \quad (7)$$

edge_behind: edge (modulation) content behind the blade, normalized by the goodness of the concerned blade, i.e., goodblade $$edge\_behind = \frac{FBnum\_behind \times 1.0 + FTnum\_behind \times 0.5 + OTmum\_behind \times 0.25}{goodblade} \quad (8)$$

range_on_2sides: product of (1) the ratio of the dynamic range values on two sides, (2) the ratio of minimum code values on two sides, and (3) the ratio of maximum values on two sides of the δ-band background_on_2sides: a flag for a significant number (e.g., 50% of the image width) of background pixels found on each side of the δ-band background_penetrated: a flag for a significant number (e.g., 50% of the image width) of background pixels found on each side in the immediate neighborhood of the δ-band, or background pixels being penetrated by the hypothetical blade (collimation boundary)

polarity1: polarity of the blade as determined by the average direction of the gradient vectors at each edge pixel within the δ-band polarity2: polarity of the blade as determined by the number distribution of the edge (modulation) content on each side of the blade The selection of the candidate blades is a hybrid process of rule-based decision and fuzzy score-based evidence accumulation. For example, in terms of rules, a candidate blade can not go through a background region, can not have significant background regions on both sides (not necessarily in immediate neighborhood of the candidate blade) under the assumption of single exposure, can not have significant (edges) modulation on both sides, can not have similar effective dynamic range on both sides, can not have significant number of gaps within the narrow band, can not have inconsistent polarity; in terms of fuzzy scores, a candidate blade should also be well connected, fairly straight, well composited, etc. In particular, a hypothetical blade is rejected by the following tests IF (background_penetrated==TRUE
    OR background_on_2sides==TRUE
    OR range_on_2sides is sufficiently close to 1.0 (±0.05)
    OR (edge_on_2sides==TRUE AND goodblade<0.375)
    PR goodblade<MIN_GOODBLADE
    OR hits_in_band<MIN_BIN_OCCUPANCY
    OR straightness2>GOOD_STRAIGHTNESS2
    OR (connectiveness2>0.2 AND fabs(straightness1−1.0)
        >0.2 AND polarity2<0.618)
    OR (polarity1≦0.382 AND (peak-bin_occupancy×
        goodblade)<LONG_BLADE)
    ORfabs(straightness1−1.0)>1.0)
where
    IF (edge_on_one_side>(goodblade×MAX_EDGEL_
        BEHIND))
        AND edge_on_another_side>(goodblade×MAX_
            EDGEL_BEHIND))
            edge_on_2sides=TRUE
    ELSE
        edge_on_2sides=FALSE
where the predefined parameters are
    MIN_GOODBLADE: minimum goodness of a "good" blade
    MIN_BIN_OCCUPANCY: minimum bin-occupancy of a "peak" in the Hough transform domain
    GOOD_STRAIGHTNESS2: maximum straightness2 for a "good" blade
    LONG_BLADE: minimum length for a "long" blade
    MAX_EDGEL_BEHIND: non-weighted maximum number of edge pixels allowed behind a blade Here we summarize the functionality of each measure. Ideally, the bin occupancy of the peak should equal the number of pixels found in the corresponding δ-band. Therefore, the ratio between the two, i.e., the straightness1 measure given in Equation (5), could only exceed 1.0 if the line is not straight. Meanwhile, the straightness2 measure, which is the variance of the normal at each transition pixel within the δ-band, also tells us how straight the line is. Ideally, the normal should be perpendicular to the orientation of the δ-band and variance of the normals should be zero. The two connectiveness measure connectiveness1 and connectiveness2, given by Equations (6) and (7), tell different aspects of the connectiveness in terms of total number of missing points and total number of gaps between the two ends of the current blade. In general, a dashed-line like blade is better than a dotted-line like blade even though the latter may have less misses_in_band. Or in other words, a blade composed of well connected segments (even though with large gaps) is better than a rather broken blade. Any blade that results in similar dynamic range values and similar maximum and minimum code values on both sides should be discouraged. It is a valid constraint that no blade should leave background regions on both sides if we assume single exposure or only aim at the minimum bounding box for multiple exposure cases. This constraint can still be valid if we want to explicitly deal with multiple exposure, provided that a partition process is accomplished to divide the subdivision or individual radiation fields prior to applying the current method.

Of particular significance is the definition of the measure edge_behind, which is a good indication of the modulation or edge content behind the hypothetical blade. Notice that one can describe what's behind a blade because the blade is more than just a line, but instead a step edge with polarity. It is found out that a more robust measure edge_behind is defined by normalizing the weighted sum of all types of edge pixels found behind the blade with respect to the goodness of the blade under consideration, as shown in Equation (8). The reason being, it is unreasonable to reject a solid blade just because there are some weak modulation (possibly caused by x-ray leakage, hardware, etc.) behind it, while it is unreasonable to allow significant weak modulation behind a weak blade. The former helps retain some good F/B blade in the presence of secondary collimation, and the latter helps prevent false positive error particularly in the case of multiple exposure. In summary, both the confidence of the modulation behind and the confidence of the blade play roles in the selection of candidate collimation blades.

The polarity of a candidate blade is determined by the average polarity of the gradient projections, i.e., the directions of the normal gradient vectors, and always points to the inside of the radiation field, within the δ-band. In the case of single exposure, one can also tell the polarity by examining the amount of modulation (edge contents) on each side of the blade. A blade is ruled out if there is inconsistency between the polarity determined in two different ways. The polarity of a candidate will be very useful in quickly ruling out illegal blade combinations in stage 3. For example, two parallel blades should have opposite polarities to construct a valid collimation. Finally, the goodness of a candidate blade is determined according to its length and composition, as given in Equation (3).

The output of stage 2 is a list of collimation blade candidates and the associated properties, including the angle (ranging from 0 to 360° in order to code the polarity), the offset, the starting point, and ending point, the composition FBnum_in_band:FTnum_in_band:OTnum_in_band), and the goodness goodblade.

Determination of the Collimation Configuration

As the final stage, stage 3 determines the most likely possible collimation configuration using the candidate collimation blades. Auxiliary information such as the background map, a "modulation" map, and the original image is also useful to improve the robustness of the process. In terms of the level of processing, this stage is at the highest level, i.e., region-based level. Due to the novel design of the method, in particular the pixel-level filtering in stage 1 and the line-level (or more precisely, step-edge level) filtering in stage 2, the number of false positive blades has been significantly minimized. Therefore, it is possible to develop a less than too sophisticated method at this stage, to achieve reliable, flexible and efficient determination of the collimation configuration.

Stage 3 is designed as the following. At first, the candidate collimation blades from stage 2 are ranked with respect to their goodness measures. Then, each possible combination (not permutation!) of the candidate blades is represented by a node in a hypothesis testing tree as illustrated in FIG. (5). The root node of the tree corresponds to the NULL hypothesis, i.e., no collimation hypothesis. There are a total of N Level-1 nodes if there are maximum N candidate collimation blades within a possible collimation, with each Level-1 node represent a hypothetical one-side collimation. Level-2 consists of nodes representing all the two-side hypotheses. Similarly, nodes at Level-3 correspond to three-side collimation hypotheses. If only collimation configurations with up to four sides are considered, the tree does not grow beyond Level-4. However, such a tree-structured scheme allows collimation with arbitrary number of blades with possible changes in the definitions of some FOMs. For example, if a hexagonal collimation is assumed, the FOM regarding orthogonality no longer applies and hence should be changed appropriately. Next, the hypothesis test tree is traversed in a depth-first fashion, equivalent to a systematic evaluation of the possible collimation configurations. The depth-first traversing is to utilize the ranking of blades to achieve efficient computation. In this way, only good hypotheses are extended further to include more collimation blades. In other words, the method always gives priority to those hypotheses with better and more blades. On the other hand, a branch can be trimmed from a certain node down such that all the descendent nodes are ignored from the evaluation, if this node has already been penalized by at least one HUGE_PENALTY because adding more blades with lower goodness values can not recover such a HUGE_PENALTY. The only exception is given if the only HUGE_PENALTY comes from the evaluation of the aspect ratio, which may be changed favorably by adding more blades to the hypothesis. Finally, the hypothesis with highest figure-of-merit above a predefined threshold is chosen to be the estimation of the collimation after subject to a verification process.

Each legitimate combination is assigned a figure-of-merit based on geometric and spatial properties consistent with the collimation process model. These properties, i.e., figures-of-merit (FOMs), are listed as follows:

Geometry-oriented FOMs orthogonality: piecewise continuous; orthogonality of member blades $$orthogonality = \begin{cases} \sin(\theta_1 - \theta_2) \text{ if } \left[\frac{\pi}{2} - (\theta_1 - \theta_2)\right] < \text{SMALL\_ANGLE} \\ \text{PENALTY otherwise} \end{cases} \quad (9)$$

where $\theta_1$ and $\theta_2$ are the angles of the individual blades.

parallelism: piecewise continuous; parallelism of member blades $$parallelism = \begin{cases} \cos[\theta_1 - \theta_2 - \pi] & \text{if } (\theta_1 - \theta_2 - \pi) < \text{SMALL\_ANGLE} \\ \text{HUGE\_PENALTY} & \text{if } (\theta_1 - \theta_2) < \text{SMALL\_ANGLE} \\ 0 & \text{otherwise} \end{cases} \quad (10)$$

where $\theta_1$ and $\theta_2$ are the angles of the individual blades, and HUGE_PENALTY is used to forbid a combination with two parallel blades with the same polarity.

convexity: piecewise continuous; convexity of the hypothetical radiation field $$convexity = \begin{cases} \dfrac{\text{area of region } A}{\text{area of region } B} & \text{if the ratio is close to } 1(\pm 0.05) \\ \text{HUGE\_PENALTY} & \text{otherwise} \end{cases} \quad (11)$$

where region A is the hypothetical radiation field, and region B is the convex hull of region A. HUGE_PENALTY is used to forbid a collimation that leads to a non-convex radiation field.

aspect: piecewise continuous; based on the aspect ratio of the hypothetical radiation field $$aspect = \begin{cases} \dfrac{\text{height of the bounding rectangle}}{\text{width of the bounding rectangle}} & \text{if the ratio} < \text{GOOD\_ASPECT} \\ \text{HUGE\_PENALTY} & \text{otherwise} \end{cases} \quad (12)$$

where the height is taken as the longer side, independent of the orientation, of the bounding rectangle that is oriented along with the hypothetical radiation field, GOOD_ASPECT is a threshold, and HUGE_PENALTY is used to penalize a hypothesis that leads to an exceptionally elongated radiation field.

Region-oriented FOMs centrality: piecewise continuous; centrality of the hypothetical radiation field $$centrality = \frac{centrality_i + centrality_j}{2} \quad (13)$$

where $$centrality_i = \begin{cases} 1 - \dfrac{abs(cen_i - centroid_i)}{cen_i \times 0.618} & \text{if } centrality_i < 0 \\ \text{HUGE\_PENALTY} & \text{otherwise} \end{cases} \quad (14)$$

and $$centality_j = \begin{cases} 1 - \dfrac{abs(cen_j - centroid_j)}{cen_j \times 0.618} & \text{if } centrality_j < 0 \\ \text{HUGE\_PENALTY} & \text{otherwise} \end{cases} \quad (15)$$

where ($cen_i$, $cen_j$) is the coordinate of the image center, ($centroid_i$, $centroid_j$) is the coordinate of the centroid of the hypothetical radiation field. unlike in many previous image, HUGE_PENALTY is used to discourage strongly off-center hypothesis.

occupancy: piecewise continuous; if the occupancy ratio is defined as $$o\_ratio = \frac{\text{area of the hypothetical radiation field}}{\text{area of the whole image}} \quad (16)$$

then $$occupancy = \begin{cases} o\_ratio & o\_ratio > \text{MIN\_OCCUPANCY} \\ \text{HUGE\_PENALTY} & o\_ratio < \text{MIN\_BIN\_OCCUPANCY} \end{cases} \quad (17)$$

where MIN_OCCUPANCY is a threshold, and HUGE_PENALTY is used to penalize a hypothesis that leads to an exceptionally small radiation field.

boundary: continuous; goodness of the member blades $$boundary = \left(\sum_l goodness_l\right)^2 \quad (18)$$

which is summed over the l member blades.

perimeter: continuous; summation based on the lengths of the member blades $$perimeter = \sum_l P_l \quad (19)$$

$$P_l = \begin{cases} \text{REWARD} & \text{if condition } A \\ \text{PENALTY} & \text{if condition } B \\ 0 & \text{otherwise} \end{cases}$$

where condition A is (hits_in_band of the lth blade>LONG_BLADE), and condition B is hits_in_band×goodness of the lth blade<MIN_BIN_OCCUPANCY). Note that LONG_BLADE and MIN_BIN_OCCUPANCY are adjusted according to (1) the assumed total number of blades, and (2) the adding order of the member blades. In particular, the LONG_BLADE and MIN_BIN_OCCUPANCY for the second blade are smaller compared to those for the first blade, and so on.

contrast: continuous; inside/outside radiation field contrast $$contrast = \frac{|mean_{inside} - mean_{outside}|}{variance_{inside} + variance_{outside}} \quad (20)$$

which is a function of the low-order gray-scale statistics of the inside and outside regions of the hypothetical radiation field.

The figure-of-merit of each node is obtained by accumulating all the above individual FOMs, as shown in the generic Equation (21). The additive nature of the method allows convenient tuning of the parameters as well as the relative weighting factors of the individual FOMs. In the current invention, the tuning is not conducted in an exam specific fashion. However, since exam type information is typically available (stored in the header files) for CR images, such information can be utilized to develop an exam-type specific knowledge-based costing and reasoning process. For example, the relative weighting factors of the FOMs can be tuned according to different exam types.

geometryFOM=orthogonality+parallelism+convexity+aspect regionFOM=centrality+occupancy+contrast+boundary+perimeter (21)

FOM=geometryFOM+regionFOM

The blade combination with the highest figure-of-merit above a predefined threshold, and that passes a final verification, is chosen as the estimate of the collimation. The predefined threshold can simply be the figure-of-merit of the NULL hypothesis if the figure-of-merit of the NULL hypothesis is chosen to be static. Of course, one can choose to dynamically determine the figure-of-merit of the null hypothesis. The criteria for verification are the following

Figure 6A:
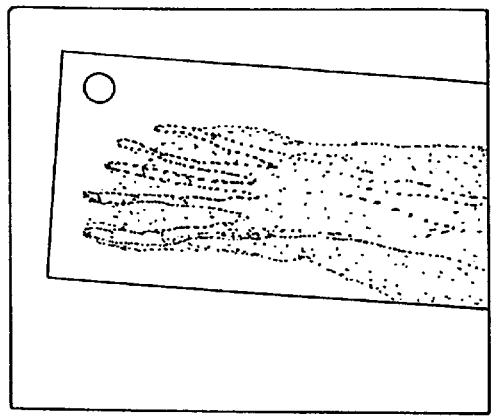
FIGS. 6a–6d are diagrammatic views useful in illustrating the present invention.
Figure 6B:
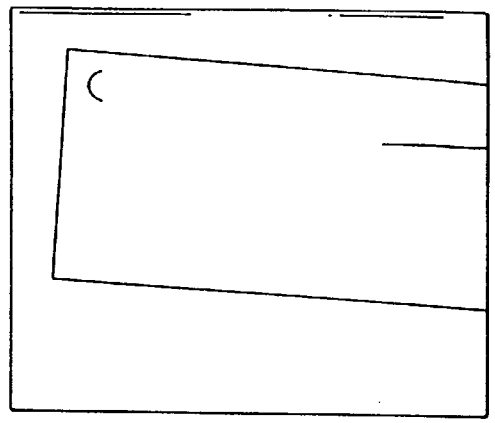
Figure 6C:
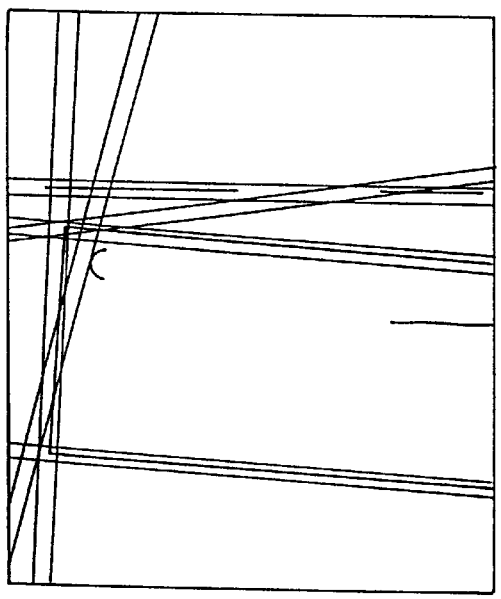
Figure 6D:
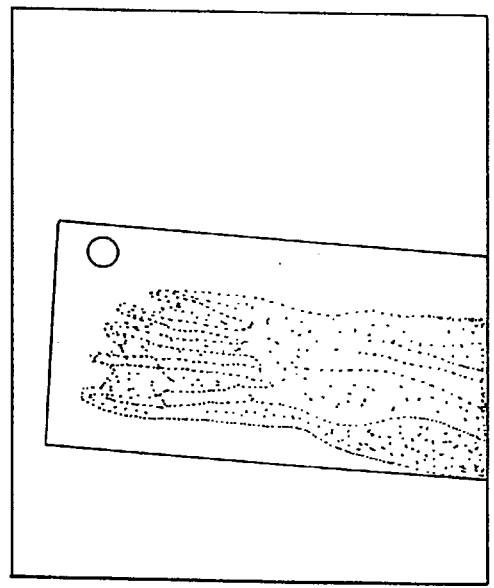

- the final radiation field should not exclude significant background region
- the final radiation field should not be composed of background region for above 90% of its area
- the final radiation field should not exclude significant modulated or textured regions FIGS. 6a–6d are diagrammatic views useful in illustrating the method of the invention. FIG. 6a shows an original image. FIG. 6b shows the results after stage 1. FIG. 6c shows the results after stage 2. FIG. 6d shows the results after stage 3.

The high level functions of a program for carrying out the method of the present invention is presented in the Appendix.

Although the invention has been described with reference to particular embodiments, it will be understood that modifications and variations thereof are within the scope of the invention.

APPENDIX

Nov 13 10:20　　　　　　　　　collim.c　　　　　　　　1

```
static char SccsId[] = "@(#)collim.c    2.2 10/17/96 RAS";
#include <stdio.h>
#include <collim. h>
#include <stdlib.h>
#include <memory.h>
#include <lsimage.h>
#define ONEBAND 1
/****************************************************
*                                                   *
* This is the main function performimg the collimation detection. *
* This routine computes an estimate of the collimation regions of *
* a CR exam (generally subsampled-by-9) and returns the resulting *
* collimation mask. Required inputs include the input image (image), *
* the nunber of rows (nrows), number of columns (ncols), discriminant *
* file nane (dstats_file), and the background left point or minima *
* (bkg_lp). Optionally (if the imput pointers are not NULL), the *
* results of the two intermediate stages of the algorithm can be *
```

APPENDIX-continued

```
 * output. These include the results of the boundary pixel detection    *
 * process or "stage I" (edge_mask) and the results of the collimation   *
 * blade detection or "stage II" (blade_mask). Note that the space for   *
 * these optional results is expected to be allocated by the calling     *
 * routine. Also, as an option, by passing a valid non-NULL FILE         *
 * pointer (vfp) verbose informational messages can be written to a      *
 * file.                                                                 *
 *                                                                       *
 * Error messages and serious warnings are written to the stderr.        *
 *                                                                       *
 **************************************************************/
#if defined(_STDC_)
unsigned char*collim_det(short *image,int ncols,int nrows,char *dstats_file,
short bkg_lp,unsigned char *bkg_mask,Sub_Exam_Info *sei,
unsigned char *edge_mask,unsigned char *blade_mask,FILE *vfp)
#else
unsigned char *collim_det(image,ncols,nrows,dstats_file,bkg_lp,bkg_mask,
sei,edge_mask;blade_mask,vfp)
    short *image;               /* input image array              */
    int ncols;                  /* number of columns of image     */
    int nrows;                  /* number of rows                 */
    char *dstats_file;          /* name of dstats file, input     */
    short bkg_lp;               /* background left point, input   */
    unsigned char *bkg_mask;    /* background mask, input         */
    Sub_Exam_Info *sei;         /* sub_exam_info structure        */
    unsignedchar *edge_mask;    /* result of stageI bound det     */
    unsigned char *blade_mask;  /* result of stageII blade det    */
    FILE *vfp;                  /* file ptr for verbose output    */
#endif
{
    unsigned char *coll_mask;   /* the result which will be returned  */
    unsigned char *bmask;       /* temporary storage for edge mask    */
    imt masksize;               /* total num bytes in mask, for alloc */
    struct lsimage *edge_lsi;   /* temp storage for in/out of ihough  */
    struct lsimage *bkg_lsi;    /* bkg mask lsi needed for peak1 ()   */
    struct lsimage *orjg_lsi;   /* lsi version of "image", ie the exam */
    struct lsimage *coll_lsi;   /* lsi for resulting collim mask      */
    struct lsimage *htio_lsi;   /* a kludge needed to use the HT routine */
    char *bladefile;            /* name of tmp file cont blade descrip */
    FILE *tfp;                  /* test file, not intended to be perm  */
/*****************************************************************
 * Initializatiom                                                 *
Nov 13 10:20                    collim.c                          2

**************************************************************/
masksize = nrows*ncols*sizeof(char);
coll_mask = (unsigned char *)malloc(masksize);
bmask = (unsigned char *)malloc(masksize);
bladefile = tmpnam(NULL);       /* create(&alloc) new file name*/
if (vfp!= (FILE *)NULL) printf("   BLADEFILE used = %s.  ",bladefile);
/**************************************************************
 * Perform stage I (collimation boundary detection) and output  *
 * if requested, ie. edge_mask != NULL. Note that bmask is not  *
 * but outputing it to calling routine as "edge_mask" is.       *
 **************************************************************/
bnd_det(image,nrows,ncols,bkg_lp,dstats_file, &bmask,vfp);
if (edge_mask != (unsigned char *)NULL) {
    memcpy(edge_mask,bnask,masksize);
}
/**************************************************************
 * Perform first part of stage II (blade detection) which is the HT.  *
 * Recall that input image is overwritten by output result. The       *
 * needs to be data storage_type LSI_TYP_2_BYTE and the image is      *
 * converted to LSI_TYP_FLOAT on return.                              *
 **************************************************************/
edge_lsi = create_lsi((char *)bmask,ncois,nrows,ONEBAND,LSI_TYP_1_BYTE,
            LSI_CM_NONE);
htio_lsi = dup_lsi(edge_lsi);/* needed to prevent destruction of edge_lsi*/
uchar2short_lsi(htio_lsi);  /* input needs to be short */
ihough(htio_lsi,(int)SII_T_FLAG,(float)SII_THRESHOLD,(FILE *)vfp);
/* WARNING!!!, lsi has been converted to float as a side effect */
/**************************************************************
 * Perform the second part of stage II, peak detection. Input must    *
 * be short and formats must be LSI image.                            *
 **************************************************************/
float2short_lsi(htio_lsi);
bkg_lsi = create_lsi((char *)bkg_mask,ncols,nrows,.1,LSI TYF 1_BYTE,LSI_CM_NONE);
orig_lsi = create_lsi((char *)image,ncols,nrows,1,LSI_TYP_2_BYTE,LSI_CM_NONE);
ipeak(htio_lsi,edge_lsi,bkg_lsi,orig_lsi,(int)SII_PNUM,(int)SII_BOCC,
```

APPENDIX-continued

```
        (int)SII_WSIZE,bladefile,vfp);
/* WARNING!!!: htio_lsi has been overwritten with resuiting blade mask
and as a side effect is now of type LSI_TYP_i_BYTE */
if (blade_mask != (unsigned char *)NULL) {  /* if interm result requested*/
  memcpy(blade_mask,htio_lsi->imagedata,masksize); /* cpy to result array*/
}
/*************************************************************
* Perform stage III, ie. coll scheme estimation. The image file  *
* must be LSIs and original is destroyed/enhanced by overlaying the *
* resulting mask on the image.                                 *
*************************************************************/
coll_lsi = create_lsi((char *)NULL,ncols,nrows,ONEBAND,LSI_TYP_1_BYTE,
          LSI_CM_NONE); /* create empty lsi for result */
coll(orig_lsi,bkg_lsi,bladefile,(int)SIII_MAXBLADES,
    (int)SIII_MAXGEOMETRY, (float)SIII_MINFOM,coll_lsi,vfp);
memcpy(image,orig_lsi->imagedata,nrow*ncols*sizeof(short));
Nov 13 10:20                    collim.h                1
```

```
#ifndef _collim_det_h
#define _collin_det_h
static char SccsId__collim_det_h[]= "@(%)collim.h    1.4 8/14/96 RAS";
#include <coll_params.h>
#include <sei.h>
#include <skin.h>
#include <lsimage.h>
/*************************************************************
* Function prototypes                                         *
*************************************************************/
#if defined(_STDC_)
unsigned char *collim_det(short *image,int ncols,int nrows,char *dstats_file,short bkg_lp,unsign
int bound_trans(short *iline,int ncols,short bkg_lpt,Dstat *dstats,short *ltrans_ptr,short *rtra
int boundary(short *idata,int nrows,int ncols,short bkg_1p,char *dstats_file,unsigned char **slm
int bnd_det(short *idata, int nrows, int ncols, short bkg_lp,char *dstats_file, unsigned char **
int coll(struct lsimage *image,struct lsimage *bkgr,char *blades,int maxblades,int maxgeometry,f
int fgrtis_bound_trans(short *iline,int ncols,short fgr_thresh,short bkg_lp,short *ltrans#ptr,sh
int ihough(struct lsimage *image,int t_flag,float threshold, FILE *vfp);
int nb_boundary(short *idata,int nrows,int ncols,unsigned char **slmask,FILE *vfp);
int ipeak(struct lsimage *image,struct lsimage *edge,struct lsimage *bkgr,struct lsimage *orig,i
int sig_trans(short *iline,int ncols,struct transition *trans);
int maxgrad(struct transition trans,short *iline)
#else
unsigned char *collim_det();
int bound_trans();
int boundary();
int bnd_det();
int coll();
int fgrtis_bound_trans();
int ihough();
int nb_boundary();
int ipeak();
int sig_trans();
int maxgrad();
#endif
#endif /* collim det_h*/
Nov 13 10:13                    coll_params.h             1
```

```
#ifndef _coll_params_h
#define _coll_params_h
static char SccsId_coll_params_h[] = "@(#)coll_params.h    1.3 8/14/96 RAS";
/*************************************************************
* Parameters used by Stage I, ie. bounary detection           *
*************************************************************/
/*************************************************************
* Parameters used by Stage II, ie. blade detection            *
*************************************************************/
#define SII_T_FLAG 1
#define SII_THRESHOLD 1.0
#define SII_PNUM 16
#define SII_BOCC 20
#define SII_WSIZE 15
/*************************************************************
* Parameters used by Stage III, ie. collimation estimation    *
*************************************************************/
#define SIII_MAXBLADES 8
#define SIII_MAXGEOMETRY -1
#define SIII_MINFOM 0.00001
#endif
Nov 13 10:28                    skin.h                  1
```

APPENDIX-continued

```
#ifndef __skin__h
#define __skin__h
static char SccsId skin h[] = "@(#)skin.h     1.1 7/29/96 RAS";
/***************************************************************
 * General stuff needed for skin-line detection, i.e. skinline()  *
 ***************************************************************/
#define DELTAROW 1
#define BKGMARGIN 3
#define BKGLPRATIO 1.0
#define SLTHRESHOLD 0
#define SLMAXTRANS 4096
#define SLMAXSLDPE 200
#define MINRANGE 100
#define MINLENGTH 6
#define SLMARGIN 3
#define YES 1
#define MAYBE 0
#define LSMOOTHSIGMA 1.0
#define DRANGE 4096
#define AGGFACTOR 8
#define MAXBKGDEV 20
#define UF 1
#define FLAT 0
#define DOWN -1
struct transition {
    int begin;
p19 int end;
};
/***************************************************************/
/***************************************************************
 * Definitions to support Gaussian maxinun likelihood classifier and  *
 * its assoociated discriminant statistics file/structure             *
 ***************************************************************/
#define MAXSTRING 80
struct __MLD {
    char class(MAXSTRING);     /* class label of this discriminant */
    int dim;                   /* dimension (i.e. *features)       */
    double *mean;              /* class nean vector                */
    double **icov;             /* inverse of the covariance matrix */
    double ldet;               /* log (in) of det of covariance    */
    double apriori;            /* a priori class probability [0,1] */
};
typedef struct __MLD MLD;
#define MAXLMAGIC "#&GMLD"
struct __dstat__struct {
    char magic[7];             /* magic string for file            */
    int nclasses;              /* number of classes in dstats file */
    int nfeatures;             /* number of features (dimensionality) */
    MLD *mid;                  /* array of MLD structures (per class) */
};
typedef struct __dstat__struct DStat;
Nov 13 10:28                   skin.h                  2
```

```
/***************************************************************/
 * Stuff to support numerical computation                        *
 ***************************************************************/
static float sqrarg;
#define SQR(a) ((sqrarg=(a)) == 0.0 ? 0.0 : sqrarg*sqrarg)
*static float maxarg1,maxarg2;
#define FMAX(a,b) (maxarg1=(a),maxarg2=(b)1(maxarg1)) (maxarg2) !
        (maxarg1) : (maxarg2))
static int iminarg1,iminarg2;
#*define IMIN(a,b) (iminarg1=(a),iminarg2=(b),(iminarg1) < (iminarg2) !
        (iminarg1) : (iminarg2))
#define SIGN(a,b) ((b) >= 0.0 ? *fabs(a) : -fabs(a))
/***************************************************************/
/***************************************************************
 * Function prototypes                                           *
 ***************************************************************/
*if defined(__STDC___)
float *vector(long nl, long nh);
float **matrix(long nrl, long nrh, long ncl, long nch);
void free__vector(float *v, long nl, long nh);
void free__matrix(float **m, long nrl, long nrh, long ncl, long nch);
double **minv (double **matrix,int dim,double **inv, double *det);
double *vvdiff(double *vector1,double *vector2, int dim, double *result);
double *mvnui(double **matrix,double *vector,int nrows,int ncols,double *result);
double viprod(double *vector1,double *vector2,int dim);
double **nnul (double **natl,int nrl,int ncl,double **nat2, int nc2,double **res);
```

APPENDIX-continued

```
unsigned char *ctransp(unsigned char *data, int nrows,int ncols);
short *stransp(short *data, int nrows, int ncols);
float pythag(float a,float b);
float *short2float(short *shorts,int numelem);
short *float2short(float *floats,int numelem);
int normeqs(float *x,float *y,int ndata,float **a,float *b,int mdim);
float ellfit(float *x,float *y,int ndata1float *soi,int_mdim);
int svbksb(float **u, float_w[], float **v, int m, int n, float b[], float x[];
int svdcnp(float **a, int m, int n, float w[], float **v);
DStat *read_dstats(char *dstat_file);
void free_dstats(Dstat *dstat);
int all_trans(short *iline,int ncols,struct transition *trans);
int skinln_trans(short *iline,int ncols,short bkg_1pt,DStat *dstats,short *1trans_ptr,short *rtr
double *genfeats(short bkg_ip,short *iline,int begin,int end,FILE *vfp);
char *gml(double *fvector,Dstat *dstat);
void check_loc(int xleft,short *ltrans_ptr,int xright,short *rtrans_ptr,int ncols);
int writehist(char *ofile,int *hist);
float sse(float *x,float *y,int ndata,float *sol);
/* void smooth(float *hist,int m,float sigma); */
int *postproc(int *hist,short *slp_ptr,short *srp_ptr);
short thresh(int *hist,int histlp,int histrp);
#else /* i.e. if K&R C */
float *vector();
float **matrix();
Nov 13 10:28                         skin.h              3 void free_vector();
void free_matrix();
double **minv();
double *vvdiff();
double *mvmul();
double viprod();
double **mmui();
unsigned char *ctransp();
short *stransp();
float pythag();
float *short2float();
short *float2short();
int normeqs();
float elifit();
int svbksb();
int svdcmp();
DStat *read_dstats();
void free_dstats();
int all_trans();
int skinln_trans();
double *genfeats ();
char *gml();
void check_ioc();
int writehist();
float sse();
void snooth();
int *postproc();
short thresh();
*endif /* _STDC_*/
/*********************************************************************/
*endif /*-skin-h*/
Nov 13 10:13                         peakl.h             1

/*
peakl.h
include file for pre-defined parameters for peak1.c
*/
/* definition of TRUE added by ras since vinclude.h was not avail */
#ifndef TRUE
#define TRUE 1
#endif
#define FBlev    255
#define FTlev    128
#define OTlev    64
#define GHOSTGAP 3
#define MINGOODBLADE 0.075
#define SAFTYZONEGAP 5
#define LONGBLADE 120
#define EDGELBEHIND 50 /* was 100 in terms of F/B, too loose, bad for M.E. */
#define lmax(x,y) ( (x) > (y) ? (x) : (y) )
#define goodstr2 1000 /*good if straightness2 <= 10.0 degree, or tumed off*/
int gjkernel[3][3] = {{-1, -2, -1}, {0, 0, 0}, {1, 2, 1}}; /* gradient j */
int gikernel[3][3] = {{-1, 0, 1}, {-2, 0, 2}, {-1, 0, 1}}; /* gradient i */
```

APPENDIX-continued

```
int bkernel[3][3] = {{3, 1, 3}, {1, 5, 1}, {3, 1, 3}}; /* butterfly1 */
int bkernel[3][3] = {{0, -2, 0}, {1, 3, 1}, {0, -2, 0}}; /* butterfly */
/* end file peakl.h */
Nov 13 10:23                        colll.h                   1
```

```
#ifndef __coll__h
#define __coll__h
static char SccsId__coll__h[] = "@(#)coll.h      1.3 10/16/96 RAS";
/*
coll.h
include file for predefined parameters for coll.c
#define TRUE 1
#define FALSE 0
#define FWINDOW1 /* can only be 1 at present for 3 x 3 Gaussian Kernei */
#define SHOWMSG 1
#define NOSHOW 0
#define BOCC 20
#define MINGOODBLADE 0.075
#define MINOCCUPANCY 0.05
#define LONGBLADE 120
#define SHORTBLADE 40
#define SCALE 4
#define GOODASPECT 4.5
#define INBKGRPERC 0.75
#define OUTBKGRPERC 0.10
#define 1max(x,y) ((x) <= (y) ? (x) : (y))
#define 1min(x,y) ((x) <= (y) ? (x) : (y))
#define maxblade 16
#define TREElev 4 /* current maximum tree level, ie max. collimation sides */
#define minfom 0.0 /* minimum fom */
/************************************************************
* Structure prototypes                                      *
************************************************************/
typedef struct RBLADE {
  int bladenum;
  float angle;
  float offset;
  int start_i, start_j;
  int end_i, end_j;
  int FBnum, FTnum, OTnum;
  float goodblade;
}RBLADE_struct; /* raw blade */
typedef struct CBLADE
  int bladenum;
  float angle;
  float offset;
  int start_i, start_j; /* now corner points */
  int end_i, end_j;     /* now corner points */.
}CBLADE_struct; /* collimation blade */
typedef struct NODE {
      int valid flag;              /* flag for validity of current node */
      int parent_valid_flag;       /* parent_valid_flag */
      int level;                   /* also tells total number of blade components */
      int childnum;                /* total number of immediate children */
      float geometryfom;           /* geometry figure-of-merit */
      float regionfom;             /* region figure-of-merit */
      struct NODE *children[maxblade];
      unsigned short bladeindex; /*index for blade components */
Nov 13 10:23                        coll.h                    2
```

```
) NODE_struct;           /* node for each possible hypothetical configuration  */
                         /* blade1 + blade2*16 + blade3*256 + blade4*4096 +..  */
                         /* extensible to unsigned int or unsigned long int    */
                         /* which allows up to 8 or 16 sides                   */
/************************************************************
* Function prototypes                                       *
************************************************************/
*if defined(___STDC___)
void readlist(char *bladefile, RBLADE_struct *blade, int *totalblade, FILE *vfp);
void writelist(unsigned_short bladeindex, int totalbladenum, char *collfile, int nrows, int ncol
void sortlist (RBLADE_struct *blade, int totalblade, FILE *vfp);
void printblade(RBLADE_struct *blade, FILE *vfp);
void copyb1ade(RBLADE_struct *des_blade, RBLADE struct *src_blade);
void create_tree(int curlevel, int maxlevel, NODE_struct *curnode, int lastblade, int totalblade
void eval_node(NODE_struct *curnode, unsigned char *mask, FILE *vfp);
void rank_nodes(NODE_struct **nodelist, int *noderank,. int totalmode, nFILE *vfp);
void printnode(NODE_struct *curnode, FILE *vfp);
void getfinalmask(unsigned char *finalmask, unsigned short bladeindex, int level, int nrows, int
int getnewmask(RBLADE_struct newblade, unsigned char *mask, int nrows, int ncols, FILE *vfp).;
```

APPENDIX-continued

```
int convtest(unsigned char *mask, int nrows, int ncols, int scale, FILE *vfp);
void regiontest(unsigned char *mask, int *area, int *centroid__int *centroid__j, float *inmean,
int bkgrtest(unsigned char *mask, unsigned char *bdata, FILE *vfp);
int area();
float cal__aspect(unsigned char *mask, int nrows, int ncols, int scale, FILE *vfp);
int rangetest(int nrows, int ncols, int j, int i);
int line__intersect2(float rho1, float theta1, float rho2, float theta2, int *x, int *y);
float distance__euc (int i, int j, int m, int n);
#else
void readlist();
void writelist();
void sortlist();
void printblade();
void copyblade();
void create__tree ();
void printnode();
void eval__node();
void rank__nodes();
void getfinalmask();
int getnewmask();
int convtest().;
void regiontest();
int bkgrtest();
float cal__convexity();
int rangetest();
int line__intersect2();
float distance__euc();
#endif
#endif
```

What is claimed is:

1. A method of processing a digital radiographic image comprising the steps of:

providing a digital radiographic image having a radiation region and a collimation region defined by collimation blades at least partially bounding said radiation region;

detecting and classifying pixels of said digital radiographic image as collimation boundary transition pixels using smart edge detection based on a classifier and a priori knowledge of the collimation process;

line level delineating of candidate collimation blades, modeled as step edges with polarity, from said collimation boundary transition pixels; and determining at a regional level the collimation region from the candidate collimation blades;

wherein said line-level delineating step includes the following steps;

performing a Hough Transform (HT) on a edge label image produced by said detecting and classifying step:

upon completion of the Hough Transform, performing peak detection to identify all "true positives", while maximally excluding "false positives"; and performing a narrow-band based inspection method to select only lines that will make possible candidates for collimation blades; and wherein said peak detection performing step includes a twisted extension of the Hough Plane, de-noising by a "butterfly" filter, and peak detection within a local window.

2. The method of claim 1 wherein said digital radiographic image is provided by a computed radiography system.

3. The method of claim 1 wherein said digital radiographic image is provided by digitizing a radiographic image presented on visual media, such as film.

4. The method of claim 1 wherein said detecting and classifying step includes using a direct exposure detection method and a method of classifying transitions in a line profile based on features associated with the profile.

5. The method of claim 1 wherein said last performing step is a hybrid process of rule-based decision and fuzzy score-based evidence accumulation including, in terms of rules, a candidate blade (a) cannot go through a background region, (b) cannot have significant background regions on both sides, (c) cannot have significant modulation on both sides, (d) cannot have significant number of gaps within the narrow band, (e) cannot have inconsistent polarity; and, in terms of fuzzy scores, a candidate blade should also be (a) well connected, (b) fairly straight, and (c) well composited.

6. The method of claim 1 wherein said regional level determining step includes the following steps:

ranking the candidate collimation blades determined by said line-level delineating step with respect to their goodness measures, representing each possible combination of the candidate blades by a node in a hypothesis test tree, with the root node corresponding to a NULL or "no collimation" hypothesis and with there being a total of N levels of nodes for N candidate blades;

traversing the hypothesis test tree in a depth-first fashion, and eliminate bad hypotheses from further evaluation;

assigning to each legitimate blade combination, a figure-of-merit total based on the sum of geometric and region figures-of-merit (FOMs) consistent with the collimation process model; and choosing the blade combination with the highest figure of merit above a predefined threshold as the estimate of the collimation field.

7. The method of claim 6 wherein said choosing step includes the step of final verification of said chosen blade combination using the following criteria: (a) the final radiation field does not exclude significant background region; (b) the final radiation field is not composed of background region for above 90% of its area; and (c) the final radiation field does not exclude significant modulated or textured regions.

8. The method of claim 6 wherein said assigning step is carried out using the following formula FOM=geometryFOM+regionFOM where
 FOM=sum of all FOMs geometryFOM=orthogonality+parallelism+convexity+aspect regionFOM=centrality+occupancy+contrast+boundary+perimeter.

9. A computer storage product comprising:

a computer readable storage medium having a computer program stored thereon for performing the method of claim 1.

* * * * *